US012613446B2

(12) United States Patent
Jolly et al.

(10) Patent No.: US 12,613,446 B2
(45) Date of Patent: Apr. 28, 2026

(54) OPTICAL MODULATOR AND IMAGE PROJECTOR BASED ON LEAKY-MODE WAVEGUIDE WITH SPATIAL MULTIPLEXING

(71) Applicant: Meta Platforms Technologies, LLC, Menlo Park, CA (US)

(72) Inventors: Sundeep Kumar Jolly, San Francisco, CA (US); Sihui He, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 397 days.

(21) Appl. No.: 18/135,020

(22) Filed: Apr. 14, 2023

(65) Prior Publication Data

US 2024/0094568 A1     Mar. 21, 2024

Related U.S. Application Data

(60) Provisional application No. 63/412,122, filed on Sep. 30, 2022, provisional application No. 63/408,295, filed on Sep. 20, 2022.

(51) Int. Cl.
G02F 1/335 (2006.01)
G02F 1/33 (2006.01)

(52) U.S. Cl.
CPC .............. G02F 1/335 (2013.01); G02F 1/332 (2013.01); G02F 2201/307 (2013.01)

(58) Field of Classification Search
CPC ..... G02F 1/332; G02F 1/335; G02F 2201/307
USPC ....................................................... 385/1–4, 7
See application file for complete search history.

(56) References Cited

U.S. PATENT DOCUMENTS

| | | | |
|---|---|---|---|
| 11,835,728 B2 | 12/2023 | Peng et al. | |
| 2018/0074457 A1 | 3/2018 | Jolly et al. | |
| 2018/0188631 A1 | 7/2018 | Lu et al. | |
| 2018/0284562 A1 | 10/2018 | Register et al. | |
| 2018/0329271 A1 | 11/2018 | Frank et al. | |
| 2018/0364487 A1 | 12/2018 | Yeoh et al. | |
| 2018/0375490 A1 | 12/2018 | Smalley | |
| 2019/0033684 A1* | 1/2019 | Favalora | G02F 1/335 |
| 2019/0094652 A1* | 3/2019 | Byrnes | G02B 6/356 |
| 2020/0292913 A1 | 9/2020 | Timurdogan et al. | |

* cited by examiner

*Primary Examiner* — Robert Tavlykaev
(74) *Attorney, Agent, or Firm* — Greenberg Traurig, LLP

(57)     ABSTRACT

A leaky-mode acousto-optical modulator may be used to generate visual images suitable for direct viewing, without image-forming optics. To extend a field of view of the modulator to limits suitable for visual displays, an array of acoustic transducers is coupled to a waveguide along its length. Each acoustic transducer generates an acoustic wave causing a corresponding leaky mode to appear. A reflector is disposed proximate each transducer for directing the out-coupled light portion at a unique angle, providing a corresponding field of view portion for that direction. The field of view portions coalesce into a continuous synthetic field of view suitable for wide-angle visual display applications.

20 Claims, 14 Drawing Sheets

<u>500</u>

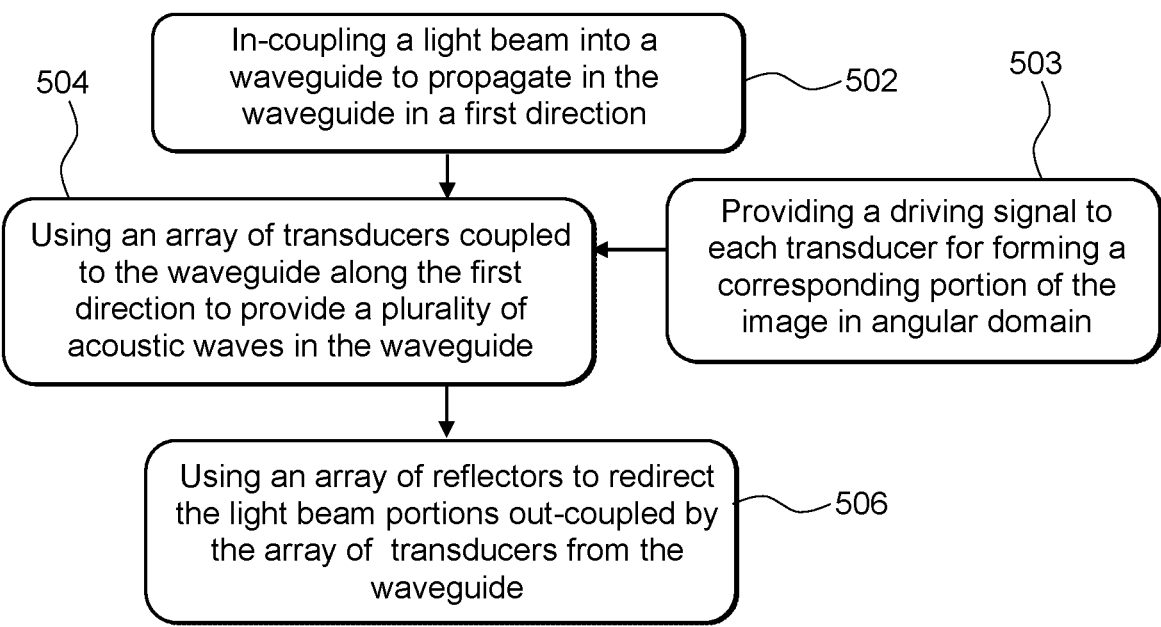

504

In-coupling a light beam into a
waveguide to propagate in the
waveguide in a first direction          502          503

Using an array of transducers coupled
to the waveguide along the first
direction to provide a plurality of
acoustic waves in the waveguide Providing a driving signal to
each transducer for forming a
corresponding portion of the
image in angular domain Using an array of reflectors to redirect
the light beam portions out-coupled by
the array of transducers from the
waveguide          506

*FIG. 5*

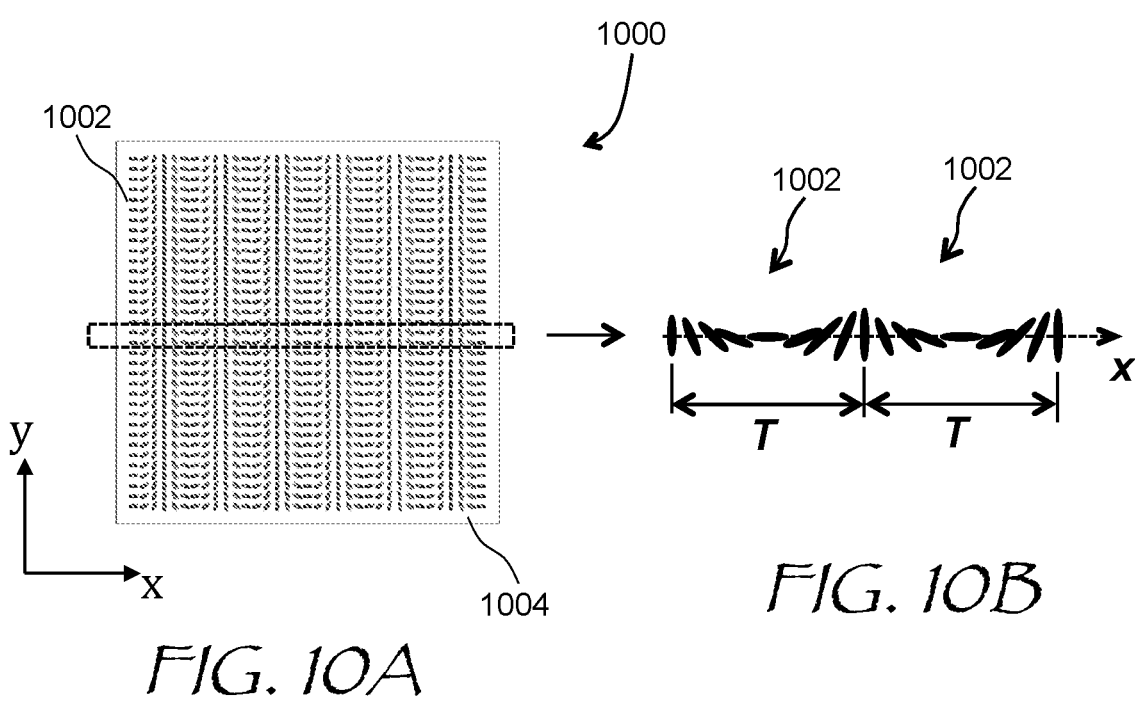
1000
1002
1002          1002
*FIG. 10A*
y
x
1004
*FIG. 10B*
x
T          T
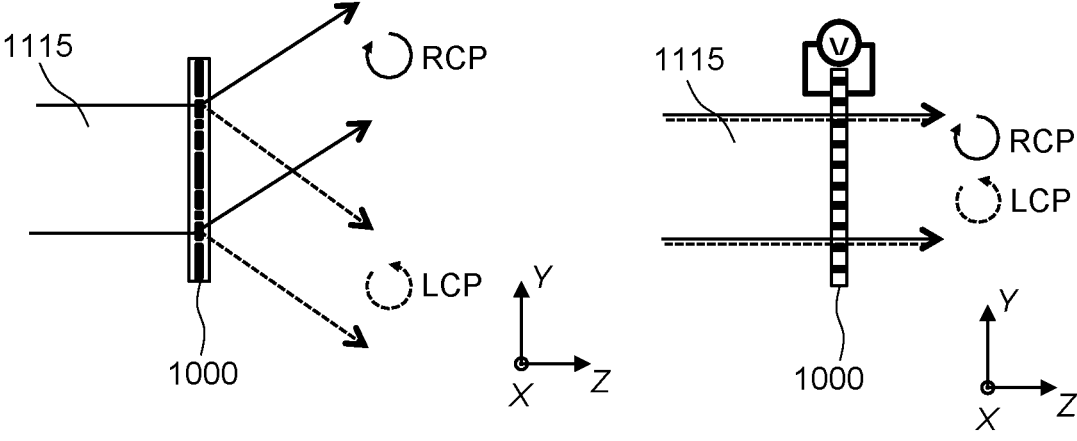
1115
RCP
LCP
1000
Y
Z
X
1115
V
RCP
LCP
1000
Y
Z
X
*FIG. 11A*
*FIG. 11B*

OPTICAL MODULATOR AND IMAGE PROJECTOR BASED ON LEAKY-MODE WAVEGUIDE WITH SPATIAL MULTIPLEXING

REFERENCE TO RELATED APPLICATIONS

This application claims priority from U.S. Provisional Patent Application No. 63/408,295 entitled "Acousto-Optical Modulator and Display Based Thereon" filed on Sep. 20, 2022, and U.S. Provisional Patent Application No. 63/412,122 entitled "Thin Film Acousto-Optical Modulator and Display Based Thereon" filed on Sep. 30, 2022, both of which being incorporated herein by reference in their entireties.

TECHNICAL FIELD

The present disclosure relates to display devices, image projectors, optical modulators, and components and modules therefor.

BACKGROUND

Visual displays provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems, such s near-eye displays or NEDs, are intended for individual users.

An artificial reality system generally includes an NED, for example a headset or a pair of glasses, configured to present content to a user. The NED may display virtual objects or combine images of real objects with virtual objects, as in virtual reality (VR), augmented reality (AR), or mixed reality (MR) applications. For example, in an AR system, a user may view both images of virtual objects (e.g., computer-generated images) and the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Head-mounted display devices may benefit from and efficient image forming optical train that does not rely on complex image generation and projection systems including bulk lenses, image-replicating lightguides, display panels, etc.

BRIEF DESCRIPTION OF THE DRAWINGS

Exemplary embodiments will now be described in conjunction with the drawings, in which:

FIG. 5 is a flow chart of a method for forming an image in angular domain using spatial FOV multiplexing;

FIG. 10A is a frontal view of an active Pancharatnam-Berry phase (PBP) liquid crystal (LC) grating usable in optical modulators and image projectors of this disclosure;

FIG. 10B is a magnified schematic view of LC molecules in an LC layer of the active PBP LC grating of FIG. 10A;

FIGS. 11A and 11B are side schematic views of the active PBP LC grating of FIGS. 10A and 10B, showing light propagation in OFF (FIG. 10A) and ON (FIG. 10B) states of the active PBP LC grating;

DETAILED DESCRIPTION

Figure 1:
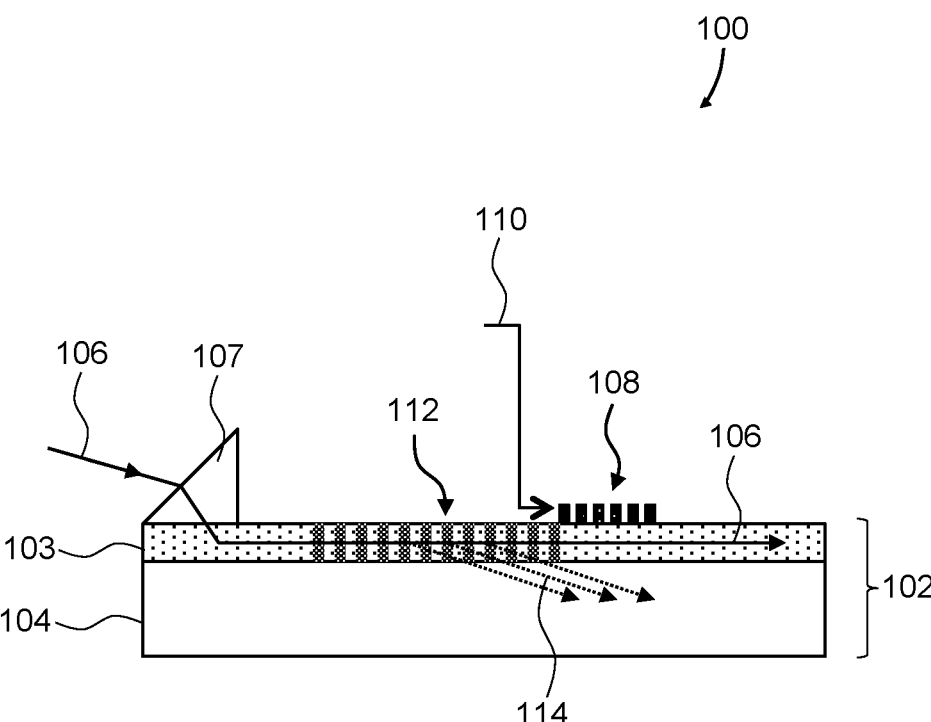
FIG. 1 is a schematic side cross-sectional view of an optical modulator of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIG. 1 to FIG. 4 and FIGS. 6 and 7, similar reference numerals denote similar elements.

A leaky-mode acousto-optical modulator includes a waveguide and a transducer coupled to the waveguide for creating an acoustic wave in the waveguide. The acoustic wave excites a leaky mode of propagation of light in the waveguide, causing out-coupling of a portion of the light from the waveguide. The out-coupling angle of the leaked light portion depends on the period of the acoustic wave, which in its turn depends on the frequency of an electrical driving signal applied to the transducer. Accordingly, a distribution of driving frequencies of the electrical driving signal creates an angular distribution of brightness of the out-coupled leaked light portions, providing a basis for a monolithically integrated visual display that generates an angular domain image directly, without having to rely on beam scanning, micro-displays, or other image forming optics/electro-optics. A dependence of acoustically induced out-coupling on wavelength and, hence, the color of the guided light beam, enables one to extend this technology to color displays, in which a color image may be generated directly in a same element. A two-dimensional field of view may be provided by an array of leaky-mode acousto-optical modulators.

One drawback of a leaky-mode acousto-optical modulator in the context of a visual display application is a limited field of view (FOV) range, which often does not exceed 10 degrees. It would therefore be beneficial to provide a technique allowing the extension of the generated FOV.

In accordance with this disclosure, the FOV extension to limits suitable for visual displays may be achieved by spatial and/or temporal multiplexing of FOV portions provided by leaky-mode acousto-optical modulators.

For spatial FOV multiplexing, an array of transducers may be coupled to the waveguide along its length. Each transducer may generate an acoustic wave that causes a corresponding leaky mode to appear. A reflector may be provided and disposed proximate each transducer for directing the out-coupled (leaked) light portion at a unique angle, providing a corresponding FOV portion for that direction. Different FOV portions redirected at different angles may be configured to at least partially overlap with one another, creating a large and continuous synthetic FOV that is adequate for wide-angle visual display applications.

For temporal FOV multiplexing, a leaky-mode acousto-optical modulator may be equipped with a switchable beam redirector, e.g. a switchable-angle reflector. The switchable-angle reflector may include for example, a pitch-tunable diffraction grating, a plurality of switchable volume Bragg gratings at different Bragg angles, and/or volume Bragg gratings at different Bragg angles that are wavelength-and/or polarization-selective. For the latter two cases, a light source with several rapidly switchable wavelengths (optionally several wavelengths per color channel) and/or polarization states may be used to achieve the grating switching function.

In accordance with the present disclosure, there is provided an optical modulator comprising a waveguide for guiding a light beam therein in a first direction. An array of transducers is coupled to the waveguide along the first direction. Each transducer is configured to provide, responsive to a driving signal, an acoustic wave in the waveguide. The acoustic wave excites a leaky mode of propagation of the light beam in the waveguide, resulting in out-coupling of a portion of the light beam from the waveguide. The optical modulator further includes an array of reflectors for redirecting the light beam portions out-coupled by the array of transducers from the waveguide. Different out-coupled portions are redirected at different angles. The array of reflectors may include e.g. an array of volume Bragg gratings. Reflectors of the array of reflectors may be spatially separated from one another for reflecting spatially separated out-coupled portions.

In embodiments where the waveguides comprises a layer of piezoelectric material, the waveguide may further include a transparent insulator substrate supporting the layer of piezoelectric material. A thickness of the layer of piezoelectric material may be less than 1 micrometer. Each transducer may include an electrode coupled to the layer of piezoelectric material. The waveguide may include a layer of photoelastic material, each transducer of the array of transducers comprising a piezoelectric material mechanically coupled to the layer of photoelastic material.

In accordance with the present disclosure, there is provided an image projector comprising a light source for providing a light beam, a waveguide comprising an in-coupler for in-coupling the light beam to propagate in the waveguide in a first direction, and an array of transducers coupled to the waveguide along the first direction. Each transducer is configured to provide, responsive to a driving signal, an acoustic wave in the waveguide, the acoustic wave exciting a leaky mode of propagation of the light beam in the waveguide resulting in out-coupling of a portion of the light beam from the waveguide.

The image projector further includes an array of reflectors for redirecting the light beam portions out-coupled by the array of transducers from the waveguide and toward an exit pupil of the image projector, where different out-coupled portions are redirected at different angles. Angular distributions of brightness of the out-coupled light beam portions may be defined by frequency spectra of the driving signals applied to the corresponding transducers of the array of transducers, each angular distribution of brightness forming a portion of an image in angular domain projected by the image projector. The array of reflectors may include e.g. an array of volume Bragg gratings.

The angles of redirection of the light beam portions by different reflectors of the array of reflectors may be selected such that neighboring portions of the image in angular domain at least partially overlap with one another. A controller may be operably coupled to the array of transducers for providing a driving signal to each transducer of the array of transducers for forming a corresponding portion of the image in angular domain.

In some embodiments, the waveguide comprises a layer of piezoelectric material e.g. less than 1 micrometer thick, and the waveguide includes a transparent insulator substrate supporting the layer of piezoelectric material. Each transducer may include an electrode coupled to the layer of piezoelectric material. In embodiments where the waveguide comprises a layer of photoelastic material, each transducer of the array of transducers may include a piezoelectric material mechanically coupled to the layer of photoelastic material.

In accordance with the present disclosure, there is further provided a method for forming an image in angular domain. The method comprises in-coupling a light beam into a waveguide to propagate in the waveguide in a first direction, using an array of transducers coupled to the waveguide along the first direction to provide a plurality of acoustic waves in the waveguide, each acoustic wave exciting a leaky mode of propagation of the light beam in the waveguide resulting in out-coupling of a portion of the light beam from the waveguide, and using an array of reflectors to redirect the light beam portions out-coupled by the array of transducers from the waveguide, wherein different out-coupled portions are redirected at different angles.

Angular distributions of brightness of the out-coupled light beam portions may be defined by frequency spectra of driving signals applied to the corresponding transducers of the array of transducers, each angular distribution of brightness forming a portion of an image in angular domain. The angles of redirection of the light beam portions by different reflectors of the array of reflectors may be selected such that neighboring portions of the image in angular domain at least partially overlap with one another to form the image in angular domain. The method may further comprise providing a driving signal to each transducer of the array of transducers for forming a corresponding portion of the image in angular domain.

Referring to FIG. 1, an optical modulator 100 includes a waveguide 102 having a core 103 supported by a substrate 104, for guiding a light beam 106 in-coupled into the core 103 of the waveguide 102 by an in-coupler such as a prism 107. The light beam 106 may be guided by the core 103 in a single transversal mode.

A transducer 108 is coupled to the waveguide 102 for converting a driving signal 110 into an acoustic wave 112, e.g. a surface and/or a volume acoustic wave. The acoustic wave 112 propagates in the core 103 of the waveguide 102. The acoustic wave 112 excites a leaky mode of propagation of the light beam 106 in the waveguide 102, resulting in out-coupling of a portion 114 of the light beam 106 from the waveguide 102. The direction of propagation of the out-coupled light beam portion 114 depends, and can be controlled by, the frequency of the driving signal 110. In some embodiments, a dedicated piezoelectric layer may be provided between the transducer 108 and the core 103, for generating an acoustic wave. In such embodiments, the core 103 may be made of a non-piezoelectric photoelastic material.

In some embodiments, the core 103 of the waveguide 102 may include an electrically responsive anisotropic material, e.g. a piezoelectric material such as lithium niobate, for example, which may be directly excited by application of an external electric field by the transducer 108. Efficiency of the acousto-optical interaction on the optical modulator 100 is determined by an overlap of the guided-mode optical field with the acoustic field, mediated by the material permittivity change induced by the applied mechanical strain due to photoelasticity. This overlap is limited by the lateral size of the optical mode, and therefore thinner optical modes afforded by thinner cores 103 will have a larger overlap and a higher conversion efficiency. A thin film lithium niobate, or another piezoelectric thin film deposited on insulating substrates such as glass, can allow for reduced waveguide geometries as well as smaller propagating optical modes. Therefore, the overlap between the applied acoustic field and guided optical field may be considerably higher relative to indiffused waveguide embodiments, allowing acousto-optical modulator devices to operate with a much higher diffraction efficiency. In some embodiments, a thickness of the layer of piezoelectric material forming the core 103 may be less than 1 micrometer.

Figure 2:
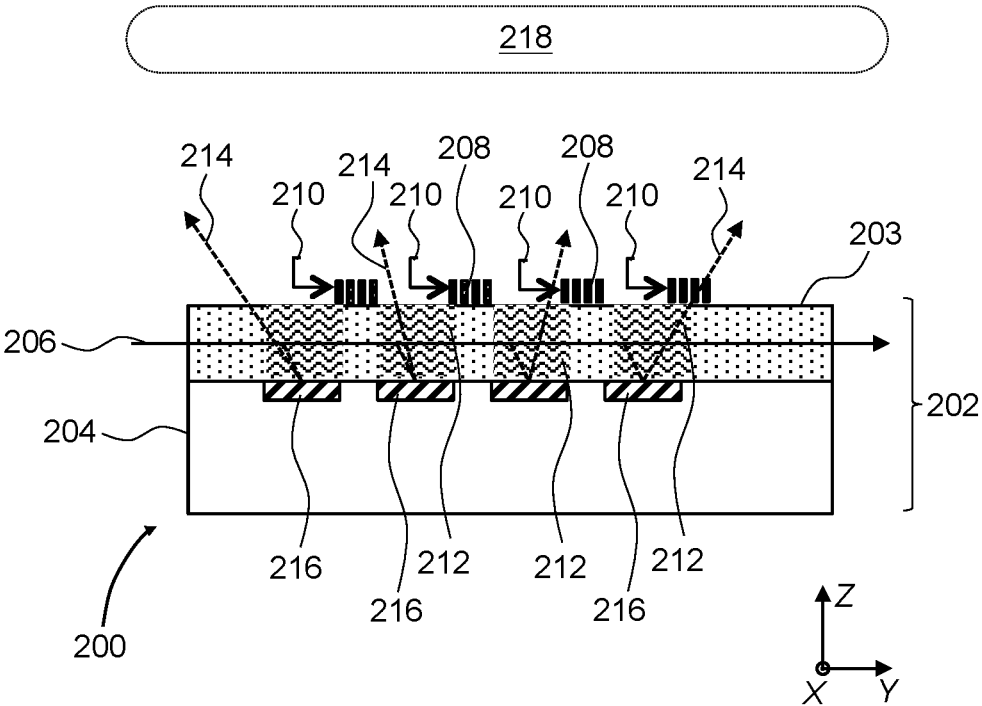
FIG. 2 is a schematic side cross-sectional view of an optical modulator with arrayed acoustic excitation.

Referring to FIG. 2, an optical phase modulator 200 operates by a similar principle of acoustic induction of leaky mode as the optical modulator 100 of FIG. 1, and may include any of the embodiments or modifications described above with respect to the optical modulator 100 of FIG. 1. The optical phase modulator 200 of FIG. 2 includes a waveguide 202 having a core 203 supported by a substrate 204, for guiding a light beam 206 along the waveguide core 203 extending in Y-direction. Not one but an array of transducers 208 is coupled to the waveguide 202 along the waveguide core 203, i.e. along the Y-direction in FIG. 2.

Each one of the transducers 208 is configured and operates similarly as the transducer 108 of the optical modulator 100 of FIG. 1. For instance, in embodiments where the waveguide core 203 includes a layer of piezoelectric material, each transducer may include an electrode structure, e.g. an array of interlaced or interdigitated electrodes, coupled to the layer of piezoelectric material for directly exciting acoustic waves in the layer of piezoelectric material. To maximize the interaction between the acoustic wave and the light wave, the piezoelectric layer may be made thin, e.g. less than one micrometer thick, and may be supported by a substrate including a comparatively thick layer of transparent insulator such as glass. In embodiments where the waveguide core 203 is not piezoelectric but includes an isotropic photoelastic material, each transducer may include a dedicated fragment or portion of piezoelectric material coupled to the wave-guiding layer of photoelastic material. The piezoelectric material fragment generates an acoustic wave when energized by an electrode structure coupled to the piezoelectric material fragment, and the acoustic wave gets coupled to the core layer of the photoelastic material.

Regardless of its structure, each transducer 208 provides, responsive to a corresponding driving signal 210, an acoustic wave 212 in or along the core 203 of the waveguide 202. The acoustic wave 212 excites a leaky mode of propagation of the light beam 206 in the waveguide 202, resulting in out-coupling of corresponding portions 214 of the light beam 206 from the waveguide 202. In other words, the driving signals 210 applied to the corresponding transducers 208 cause the transducers 208 to generate acoustic waves 212 propagating in the waveguide 202. The acoustic waves 212 create refractive index variations in the core 203. The refractive index variations out-couple portions 214 of the light beam 206 from the waveguide 202.

The optical modulator 200 further includes an array of reflectors 216 disposed to receive and redirect respective out-coupled portions 214 of the light beam 206 towards an exit pupil 218 of the optical modulator 200 at different angles as illustrated. Different out-coupled portions 214 are intercepted by different reflectors 216. To that end, the reflectors 216 may be spatially separated from one another for reflecting spatially separated out-coupled portions, as illustrated.

The directions of propagation of the portions 214 of the light beam 206, or a distribution of such directions, depend on the frequencies of the driving signals 210. The directions of propagation of the portions 214 can be controlled within a pre-defined cone of directions. Angular distributions of brightness of the out-coupled light beam portions 214 are defined by frequency spectra of the driving signals 210 applied to the corresponding transducers 208. Each angular distribution of brightness may thus form a portion of an image in angular domain. The reflectors 216 may be oriented such that the portions of the image in angular domain coalesce into a larger, continuous image in angular domain that can be directly viewed by a display user.

Figure 3:
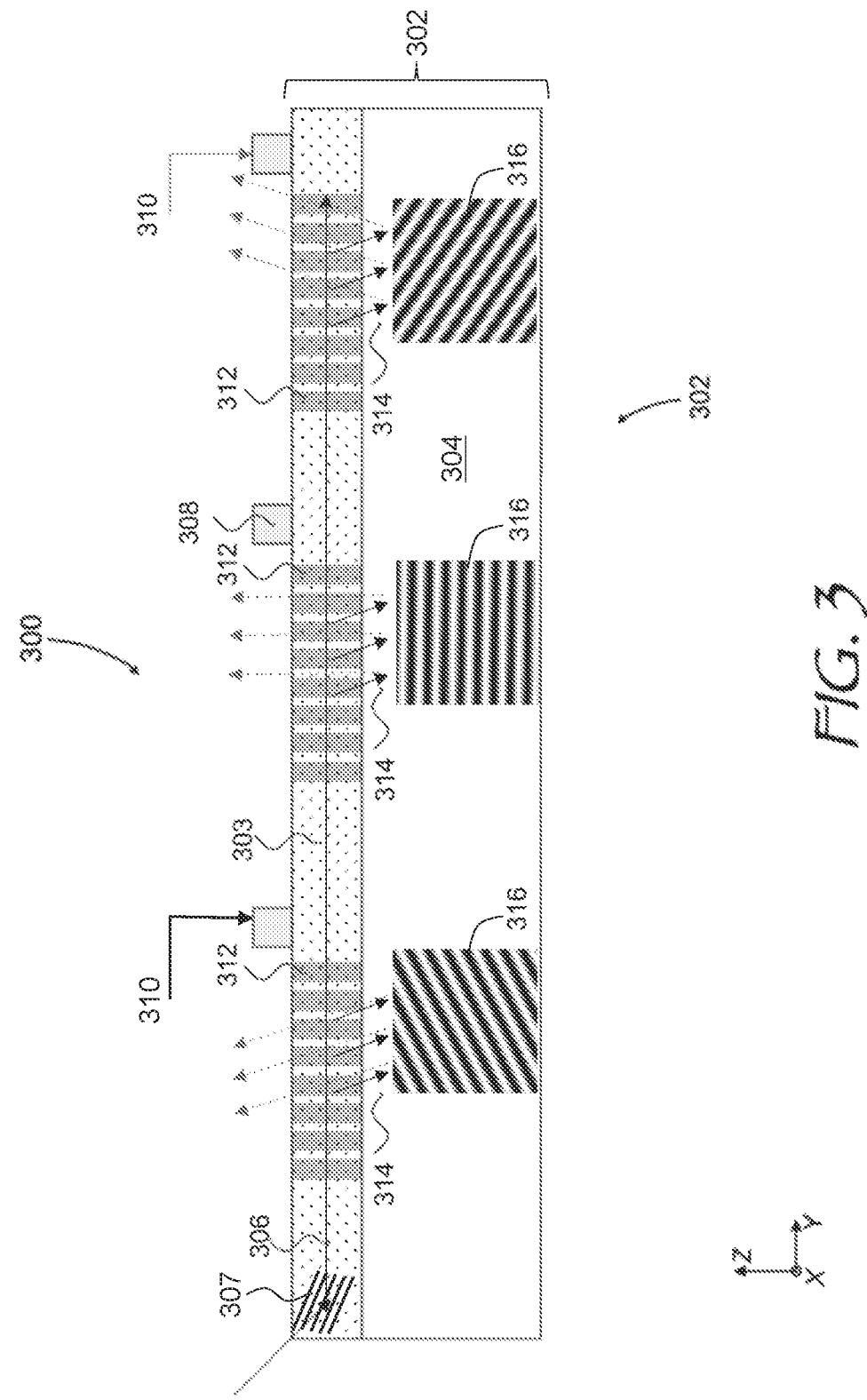
FIG. 3 is a schematic side cross-sectional view of an example implementation of the optical modulator of FIG. 2.

Referring now to FIG. 3 with further reference to FIG. 2, an optical modulator 300 is an example implementation of the optical modulator 200 of FIG. 2. The optical modulator 300 of FIG. 3 includes a waveguide 302 having a core 303 supported by a substrate 304, for guiding a light beam 306 along the waveguide core 303 extending in Y-direction. The light beam 306 is in-coupled into the waveguide 302 by an in-coupling reflection grating 307.

An array of transducers 308 is coupled to the waveguide 302 along the waveguide core 303, i.e. along Y-direction. The transducers 308 are configured to convert driving signals 310 into acoustic waves 312 propagating in the core 303 of the waveguide 302 for out-coupling portions 314 of the light beam 306 into leaky propagation modes. Herein and throughout the specification, the term "propagating in the core" or "propagating in the waveguide" includes the case of surface acoustic waves and volume acoustic waves. The directions of propagation of the out-coupled portions 314 of the light beam 306 depend on the frequencies of the driving signals 310, and can be controlled within a pre-defined cone of directions, e.g. a 10-degree cone.

The optical phase modulator 300 further includes an array of Bragg reflectors 316 disposed in the substrate 304. The Bragg reflectors 316 comprise fringes oriented to redirect respective out-coupled portions 314 of the light beam 306 at different angles. Different out-coupled portions 314 are thus redirected in different directions. The Bragg reflectors 316 and the transducers 308 may be configured such that cones of directions provided by individual transducers 308 may overlap forming a larger compound cone of directions. For example, eight Bragg reflectors 316 (only three shown in FIG. 3) may provide about a 60 degree-wide cone, with some overlap between neighboring 10 degree-wide cones.

Figure 4:
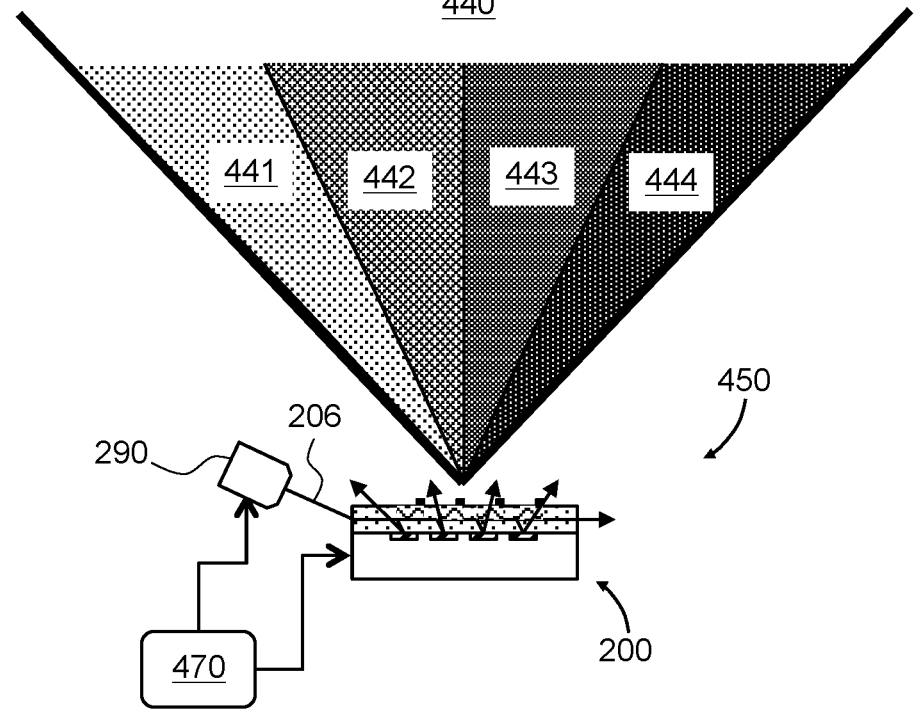
FIG. 4 is a schematic side view of an image projector based on the optical phase modulator of FIG. 2 with spatial field of view (FOV) multiplexing.

The principle of concatenation of field of view (FOV) portions, or portions of image in angular domain, is illustrated in FIG. 4. An image projector 450 includes a light source 290 coupled to the optical modulator 200 of FIG. 2. In operation, the light source 290 emits the light beam 206 (FIG. 4), which is in-coupled into the optical modulator 200. The optical modulator 200 operates as explained above with reference to FIG. 2, out-coupling the light beam portions 214 (FIG. 2) at different angles. Each out-coupled light portion propagates within one of cones 441, 442, 443, 444 of directions (FIG. 4). The cones 441, 442, 443, 444 combine into a compound cone 440 of directions. The cones 441, 442, 443, 444 may overlap in some embodiments to provide the continuous compound cone 440 of directions, or a compound FOV, or a compound image in angular domain.

A controller 470 may be operably coupled to the light source 290 and the optical modulator 200 for providing a plurality of driving signals to the transducers of the optical modulator 200 based on an image to be displayed by the image projector 450. Angular distributions of brightness of the out-coupled light beam portions, defined by frequency spectra of the driving signals applied to the corresponding transducers, form portions of an image in angular domain projected by the image projector 450. Each transducer is driven to provide a portion of the image within its corresponding angular cone, such that the compound cone of directions 440 covers the entire FOV of the image projector 450.

Referring now to FIG. 5 with further reference to FIGS. 2 and 4, a method 500 for forming an image in angular domain may be performed using e.g. the image projector 450 of FIG. 4. The method 500 includes in-coupling (502) a light beam, e.g. the light beam 206 (FIG. 2) into a waveguide, e.g. the waveguide 202 (FIG. 2) to propagate in the waveguide in a first direction, e.g. Y-direction in FIG. 4. The method further includes using an array of transducers coupled to the waveguide along the first direction, e.g. the transducers 208 coupled to the core 203 of the waveguide 202 (FIG. 2), to provide (FIG. 5; 504) a plurality of acoustic waves in the waveguide, each acoustic wave exciting a leaky mode of propagation of the light beam in the waveguide resulting in out-coupling of a portion 214 of the light beam 206 from the waveguide 202. An array of reflectors, e.g. the reflectors 216, is used (506) to redirect the light beam portions out-coupled by the array of transducers from the waveguide. Different out-coupled portions are redirected at different angles. As explained above with reference to FIGS. 2 and 4, angular distributions of brightness of the out-coupled light beam portions are defined by frequency spectra of the driving signals applied to the corresponding transducers of the array of transducers, each angular distribution of brightness forming a portion of an image in angular domain projected by the image projector 450. The angles of redirection of the light beam portions by different reflectors of the array may be selected such that neighboring portions of the image in angular domain at least partially overlap with one another to form one continuous image in angular domain. A driving signal may be provided (503) to each transducer of the array of transducers for forming a corresponding portion of the image in angular domain by providing the plurality of acoustic waves at 504. Frequency spectra of the driving signals define angular distributions of brightness of the out-coupled light beam portions, which combine into an image in angular domain spanning the entire FOV of the display device, as explained above with reference to FIG. 4.

Figure 6:
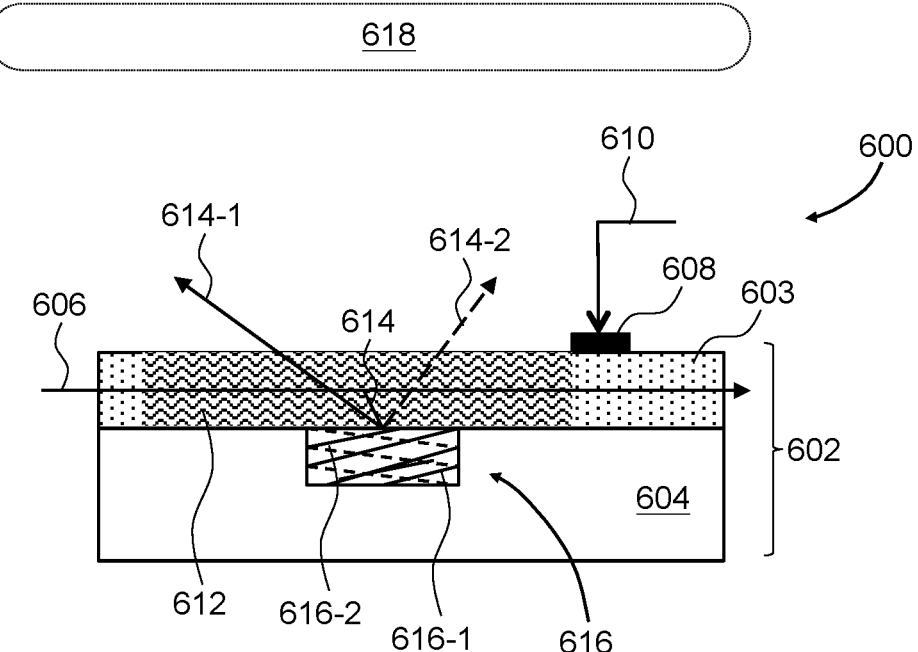
FIG. 6 is a schematic side cross-sectional view of an optical modulator with a switchable beam redirector for temporal FOV multiplexing.

Referring now to FIG. 6, an optical modulator 600 operates by a similar principle of leaky mode induction/generation as the optical modulator 100 of FIG. 1, and may include any of the embodiments or modifications described above with respect to the optical modulator 100 of FIG. 1. The optical phase modulator 600 of FIG. 6 includes a waveguide 602 having a core 603 supported by a substrate 604, for guiding a light beam 606 along the waveguide core 603. The light beam 606 may propagate in the waveguide core 603 in a single transversal mode, i.e. the waveguide 602 may be a single-mode waveguide.

A transducer 608 is coupled to the core 603 of the waveguide 602. The transducer 608 is configured to provide, responsive to a driving electrical signal 610, an acoustic wave 612 in the waveguide 602. In embodiments where the waveguide core 603 includes a layer of piezoelectric material, the transducer 608 may include an electrode structure, e.g. an array of interlaced or interdigitated electrodes, coupled to the layer of piezoelectric material for directly exciting acoustic waves in the layer of piezoelectric material. The acoustic wave 612 generated by the transducer 608 excites a leaky mode of propagation of the light beam 606 in the waveguide 602, resulting in out-coupling of a portion of the light beam 606 from the waveguide 602, forming an output beam 614.

The output beam 614 impinges onto a beam redirector 616, which is configured to switchably redirect the output beam 614 at a plurality of angles and generally toward an exit pupil 618 of the optical modulator 600. An angular distribution of brightness of the output beam 614 is defined by a frequency spectrum of the driving signal 610 applied to the transducer 608. The angular distribution of brightness at each one of the plurality of angles of redirection forms a portion of an image in angular domain being displayed.

The beam redirector 616 may be implemented in a variety of ways. In the embodiment illustrated, the beam redirector 616 includes superimposed first 616-1 and second 616-2 switchable volume Bragg gratings. For example, the first volume Bragg grating 616-1, shown in solid lines, may redirect the output beam 614 in a first direction 614-1 shown with a solid arrow, and the second volume Bragg grating 616-2, shown in dashed lines, redirects the output beam 614 in a second, different direction 514-2 shown with a dashed arrow. The switchable volume Bragg gratings 616-1 and 616-2 may be engaged in a time-sequential manner, enabling a time-sequential coverage of a larger cone of output angles. More than two switchable Bragg gratings may be provided to increase the number of the angles of redirection by the beam redirector 616.

The switchable volume Bragg gratings 616-1 and 616-2 of the beam redirector 616 may be switched by making the gratings wavelength- and/or polarization-selective, and rapidly changing the wavelength and/or polarization of the light beam 606 accordingly. Alternatively, the gratings themselves may be switchable ON and OFF. In other words, different gratings may be configured to redirect the light beam portion 614 at different wavelengths and/or polarizations of the light beam 606, or alternatively the grating's diffraction efficiency for visible light may be switchable or tunable. Gratings of different types may be used in the beam redirector 616, including gratings with tunable or switchable pitch or grating period such as fluidic gratings, liquid crystal gratings, etc.

Figure 7:
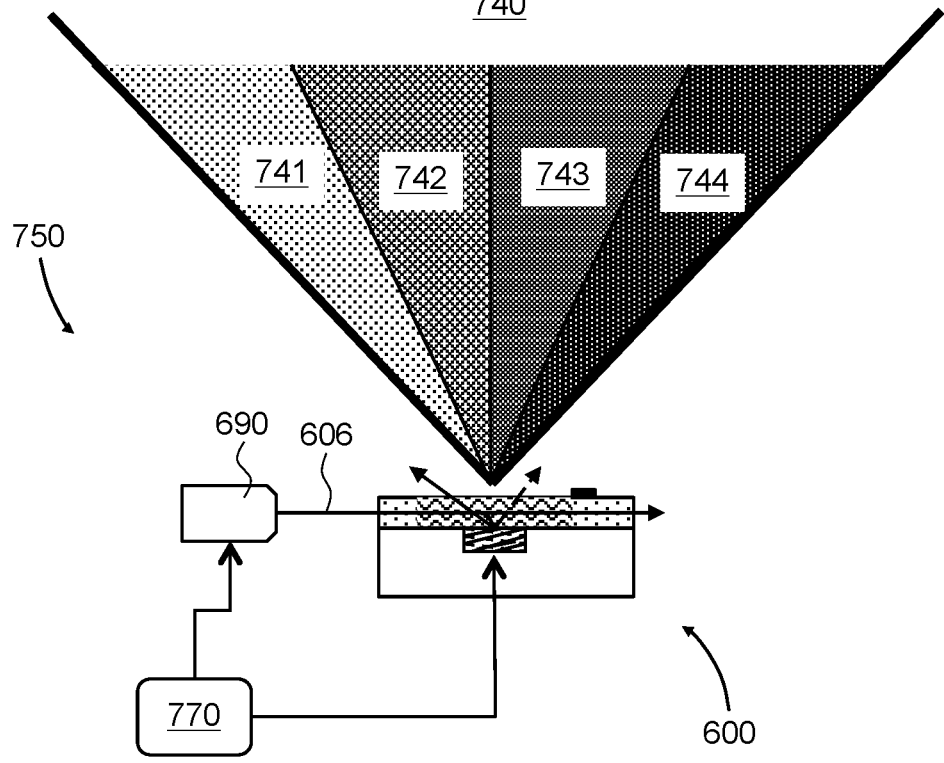
FIG. 7 is a schematic side view of an image projector based on the optical modulator of FIG. 6.

Turning to FIG. 7 with further reference to FIG. 6, an image projector 750 (FIG. 7) includes the optical modulator 600 of FIG. 6 coupled to a light source 690. In embodiments where the volume Bragg gratings 616-1 and 616-2 are wavelength- and/or polarization-selective, the light source 690 may be rapidly switchable in wavelength and/or polarization respectively, for selecting a corresponding volume Bragg grating to reflect the leaked light portion 614. Alternatively or in addition, the volume Bragg gratings 616-1 and 616-2 may be switchable or tunable in grating efficiency and/or grating pitch.

The angular distribution of brightness at each one of the plurality of angles of redirection, defined by the frequency spectrum of the driving signal 610, forms a portion of the image in angular domain, or an FOV portion, projected by the image projector 750 (FIG. 7). Different portions 741, 742, 743, 744 of a compound FOV 740 of the image projector 750 are energized one at a time to provide the compound FOV 740 in a time-sequential manner. The angles of redirection by the beam redirector 616 may be selected such that neighboring portions of the image in angular domain (i.e. neighboring FOV portions) at least partially overlap with one another.

The image projector 750 may further include a controller 770 operably coupled to the transducer 608 and the beam redirector 616 of the optical modulator 600. The controller 770 may be configured, e.g. programmed, wired, etc., to operate as follows. During a first time interval, the controller 770 may apply the driving signal 610 with a first frequency spectrum to the transducer 608 to form a first portion of the image in angular domain, and cause the beam redirector to redirect the output beam at a first angle, i.e. in the first direction 614-1. During a second, subsequent time interval, the controller 770 may apply the driving signal 610 with a second frequency spectrum to the transducer 608 to form a second portion of the image in angular domain, and cause the beam redirector 616 to redirect the output beam 614 at a second, different angle, i.e. in the second direction 614-2. During subsequent time intervals, the controller may redirect the output beam 614 at other angles, forming the FOV portions 741, 742, 743, and 744 one by one in a time-sequential manner.

Figure 8:
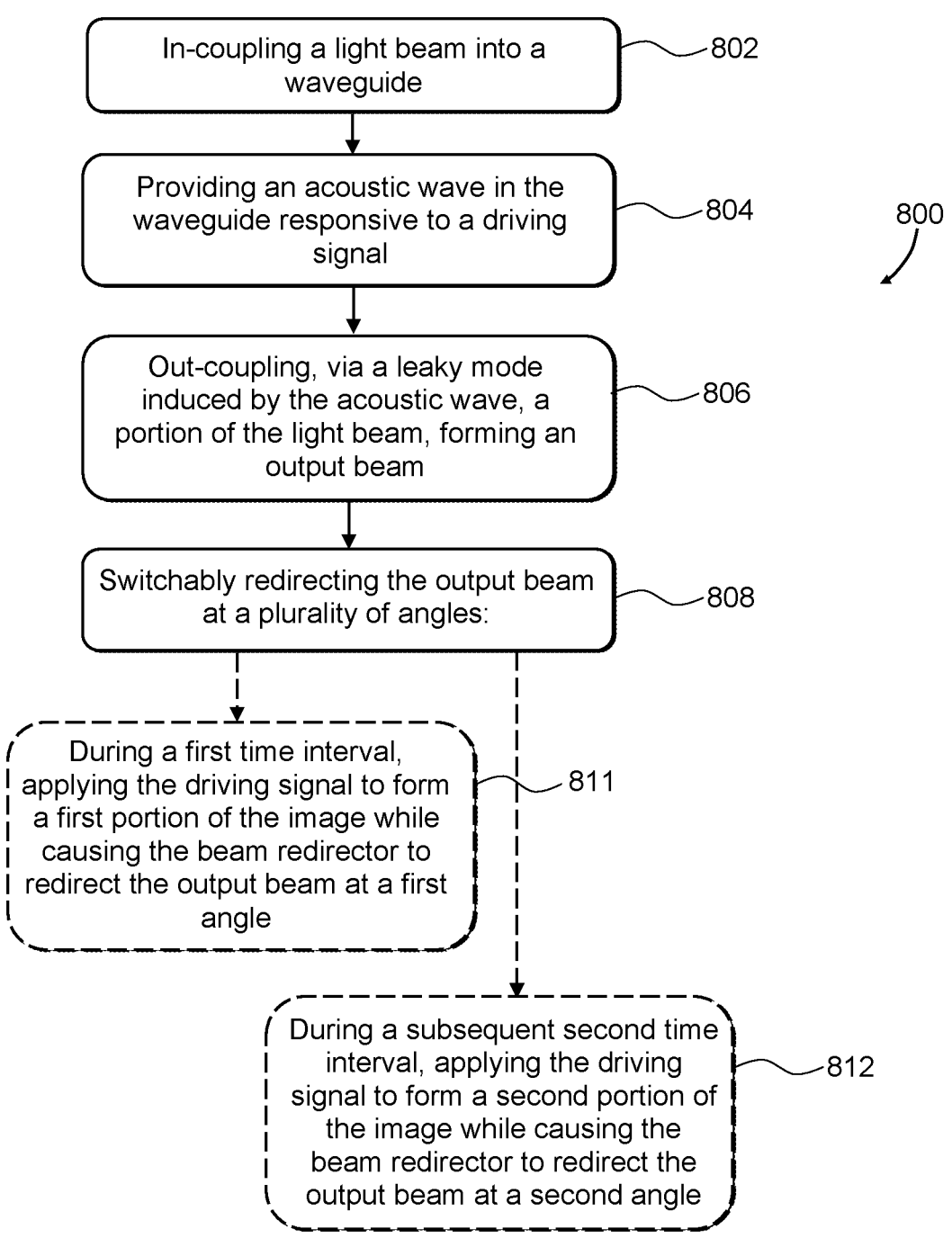
FIG. 8 is a flow chart of a method for forming an image in angular domain using temporal FOV multiplexing.

Turning now to FIG. 8 with further reference to FIGS. 6 and 7, a method 800 for forming an image in angular domain may be implemented using the image projector 750 of FIG. 7, for example. The method 800 includes in-coupling (FIG. 8; 802) a light beam into a waveguide, e.g. the light beam 606 into the waveguide 602 of FIG. 6, to propagate in the waveguide 602. A transducer, e.g. the transducer 608 of the optical modulator 600, coupled to the waveguide 602, is used to provide (FIG. 8; 804) an acoustic wave in the waveguide responsive to the driving signal 610. The acoustic wave excites a leaky mode of propagation of the light beam in the waveguide, resulting in out-coupling of a portion of the light beam from the waveguide, forming an output beam (806).

A beam redirector is used to switchably redirect (808) the output beam at a plurality of angles. By way of a non-limiting example, during a first time interval, the driving signal may be applied to the transducer to form (811) a first portion of the image in angular domain, while the beam redirector redirects the output beam at a first angle of the plurality of angles; and during a second, subsequent time interval, the driving signal may be applied to the transducer to form (812) a second portion of the image in angular domain, the beam redirector redirecting the output beam at a second, different angle of the plurality of angles. The process may then repeat for a third angle, a fourth angle, and so on.

An angular distribution of brightness of the output beam is defined by a frequency spectrum of the driving signal 610 applied to the transducer 608. The angular distribution of brightness at each one of the plurality of angles of redirection forms a portion or segment of an image in angular domain displayed by the image projector 750 (FIG. 7). The angles of the plurality of angles may be selected such that neighboring portions of the image in angular domain, i.e. the portions 741, 742, 743, 744 of the compound FOV 740 at least partially overlap with one another.

The optical phase modulators and display devices described herein may use indiffused waveguides e.g. proton-exchanged or titanium-indiffused guides, which can provide a large index contrast relative to the bulk medium, but typically have a comparatively large propagating optical mode due to a significant waveguide depth. Efficiency of the acousto-optical interaction depends upon an overlap of the guided-mode optical field with the surface acoustic wave-induced acoustic field, and is mediated by the material permittivity change induced by the applied mechanical strain. In a guided-wave acousto-optical device implemented in lithium niobate, this overlap is limited by the large optical mode size, and therefore such devices may operate with a comparatively low diffraction efficiency.

Thin piezoelectric films on an insulator substrate, e.g. thin films of lithium niobate deposited on a glass or a quartz substrate, allow for reduced waveguide geometries, as well as smaller propagating optical modes. Therefore, an overlap between the applied acoustic field and guided optical field may be increased relative to indiffused waveguide embodiments, potentially allowing for devices to operate at a higher diffraction efficiency.

As a non-limiting illustrative example, referring back to FIG. 1, the optical modulator 100 of FIG. 1 may be built with the thin-film core 103, e.g. a piezoelectric layer such as a lithium niobate layer, having a thickness of e.g. less than one micrometer, on the supporting insulating substrate 104, e.g. quartz or glass. The transducer 108 may include a set of interdigitated electrodes coupled to the piezoelectric core 103, or to an piezo-element for photoelastic, non-piezo-electric waveguides, providing the acoustic field (Rayleigh mode) 112 propagating in the waveguide 103 upon energizing the transducer 108 with the driving signal 110. As a result of interaction of the acoustic wave 112 with the propagating light beam 106, the light beam portion 114 is out-coupled from the core 103 into the substrate 104. An angular distribution of the light beam portion 114 corresponds to a frequency spectrum of the RF driving signal 110, enabling a direct generation of an image in angular domain. Similar thin-film embodiments of optical modulators may also be implemented in the optical modulator 200 of FIG. 2, the optical modulator 300 of FIG. 3, the image projector 450 of FIG. 4, the optical modulator 600 of FIG. 6, the image projector 750 of FIG. 7, and generally for any optical modulator, image projector, or a display apparatus considered herein.

The waveguide materials of the optical modulators of this disclosure may include e.g. lithium niobate, lithium tantalate, tellurium dioxide, etc. The waveguides may also be organic, e.g. the waveguides may include an organic solid crystal, anthracene, a poly(3-norbornyl-N-methylphenothiazine) (PNMPT) based material, etc. The transducers disclosed herein may include aluminum electrodes, indium tin oxide (ITO) electrodes, gold electrodes, etc.

Switchable, tunable, and/or polarization/wavelength-selective gratings suitable for redirecting out-coupled light beam portions in the optical modulator 200 of FIG. 2, the optical modulator 300 of FIG. 3, the image projector 450 of FIG. 4, the optical modulator 600 of FIG. 6, and/or the image projector 750 of FIG. 7 will now be considered with reference to FIGS. 9-14.

Figure 9:
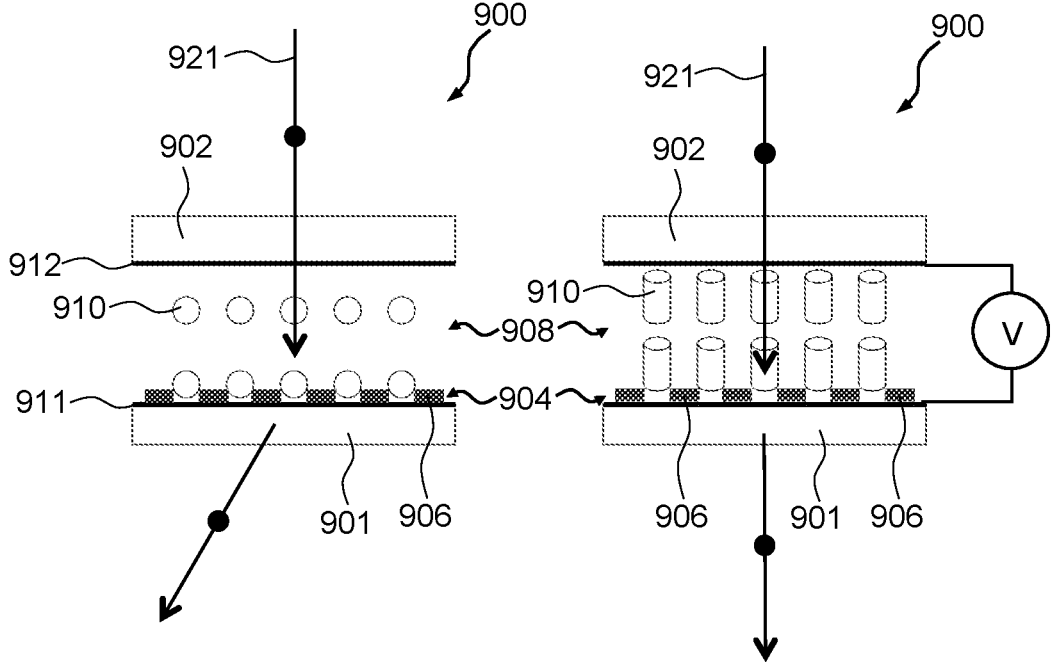
FIG. 9 shows side cross-sectional views of a tunable liquid crystal (LC) surface-relief grating usable in optical modulators and image projectors of this disclosure.

Referring first to FIG. 9, a tunable liquid crystal (LC) surface-relief grating 900 includes a first substrate 901 supporting a first conductive layer 911 and a surface-relief grating structure 904 having a plurality of ridges 906 extending from the first substrate 901 and/or the first conductive layer 911. A second substrate 902 is spaced apart from the first substrate 901. The second substrate 902 supports a second conductive layer 912. A cell is formed by the first 911 and second 912 conductive layers. The cell is filled with a LC fluid, forming an LC layer 908. The LC layer 908 includes nematic LC molecules 910, which may be oriented by an electric field across the LC layer 908. The electric field may be provided by applying a voltage V to the first 911 and second 912 conductive layers.

The surface-relief grating structure 904 may be formed from a polymer with an isotropic refractive index $n_p$ of about 1.5, for example. The LC fluid has an anisotropic refractive index. For light polarization parallel to a director of the LC fluid, i.e. to the direction of orientation of the nematic LC molecules 910, the LC fluid has an extraordinary refractive index $n_e$, which may be higher than an ordinary refractive index $n_o$ of the LC fluid for light polarization perpendicular to the director. For example, the extraordinary refractive index $n_e$ may be about 1.7, and the ordinary refractive index $n_o$ may be about 1.5, i.e. matched to the refractive index $n_p$ of the surface-relief grating structure 904.

When the voltage V is not applied (left side of FIG. 9), the LC molecules 910 are aligned approximately parallel to the grooves of the surface-relief grating structure 904. At this configuration, a linearly polarized light beam 921 with e-vector oriented along the grooves of the surface-relief grating structure 904 will undergo diffraction, since the surface-relief grating structure 904 will have a non-zero refractive index contrast. When the voltage V is applied (right side of FIG. 9), the LC molecules 910 are aligned approximately perpendicular to the grooves of the surface-relief grating structure 904. At this configuration, a linearly polarized light beam 921 with e-vector oriented along the grooves of the surface-relief grating structure 904 will not undergo diffraction because the surface-relief grating structure 904 will appear to be index-matched and, accordingly, will have a substantially zero refractive index contrast. For the linearly polarized light beam 921 with e-vector oriented perpendicular to the grooves of the surface-relief grating structure 904, no diffraction will occur in either case (i.e. when the voltage is applied and when it is not) because at this polarization of the linearly polarized light beam 921, the surface-relief grating structure 904 are index-matched. Thus, the tunable LC surface-relief grating 900 can be switched on and off (for polarized light) by controlling the voltage across the LC layer 908. Several such gratings with differing pitch/slant angle/refractive index contrast may be used to switch between several grating configurations.

Referring now to FIG. 10A, a Pancharatnam-Berry phase (PBP) LC switchable grating 1000 includes LC molecules 1002 in an LC layer 1004. The LC molecules 1002 are disposed in XY plane at a varying in-plane orientation depending on the X coordinate. The orientation angle φ(x) of the LC molecules 1002 in the PBP LC switchable grating 1000 is given by $$\phi(x)=\pi x/T=\pi x \, \sin\theta/\lambda_0 \qquad (1)$$

where $\lambda_0$ is the wavelength of impinging light, T is a pitch of the PBP LC switchable grating 1000, and θ is a diffraction angle given by $$\theta=\sin^{-1}(\lambda_0/T) \qquad (2)$$

The azimuthal angle φ varies continuously across the surface of the LC layer 1004 parallel to XY plane as illustrated in FIG. 10B. The variation has a constant period equal to T. The optical phase delay P in the PBP LC grating 1000 of FIG. 10A is due to the PBP effect, which manifests $P(x)=2\phi(x)$ when the optical retardation R of the LC layer 1004 is equal to $\lambda_0/2$.

The LC layer 1004 may be disposed between parallel substrates configured for applying an electric field across the LC layer 1004. The LC molecules 1002 are oriented substantially parallel to the substrates in absence of the electric field, and substantially perpendicular to the substrates in presence of the electric field, making the PBP structure "erasable".

FIGS. 11A and 11B illustrate the operation of the PBP LC switchable grating 1000 of FIG. 10A. In FIG. 11A, the PBP LC switchable grating 1000 is in OFF state, such that its LC molecules 1002 (FIGS. 10A, 10B) are disposed predominantly parallel to the substrate plane, that is, parallel to XY plane in FIG. 10A. When an incoming light beam 1115 is left-circular polarized (LCP), the PBP LC switchable grating 1000 redirects the light beam 1115 upwards by a pre-determined non-zero angle, and the beam 1115 becomes right-circular polarized (RCP). The RCP deflected beam 1115 is shown with solid lines. When the incoming light beam 1115 is right-circular polarized (RCP), the PBP LC switchable grating 1000 redirects the beam 1115 downwards by a pre-determined non-zero angle, and the beam 1115 becomes left-circular polarized (LCP). The LCP deflected beam 1115 is shown with dashed lines. Applying a voltage V to the PBP LC switchable grating 1000 reorients the LC molecules along Z-axis, i.e. perpendicular to the substrate plane as shown in FIG. 10B. At this orientation of the LC molecules 1002, the PBP structure is erased, and the light beam 1115 retains its original direction, whether it is LCP or RCP. Thus, the active PBP LC grating 1000 is a tunable grating, i.e. it has a variable beam steering property. Furthermore, the operation of the active PBP LC grating 1000 may be controlled by controlling the polarization state of the impinging light beam 1115.

Figure 12A:
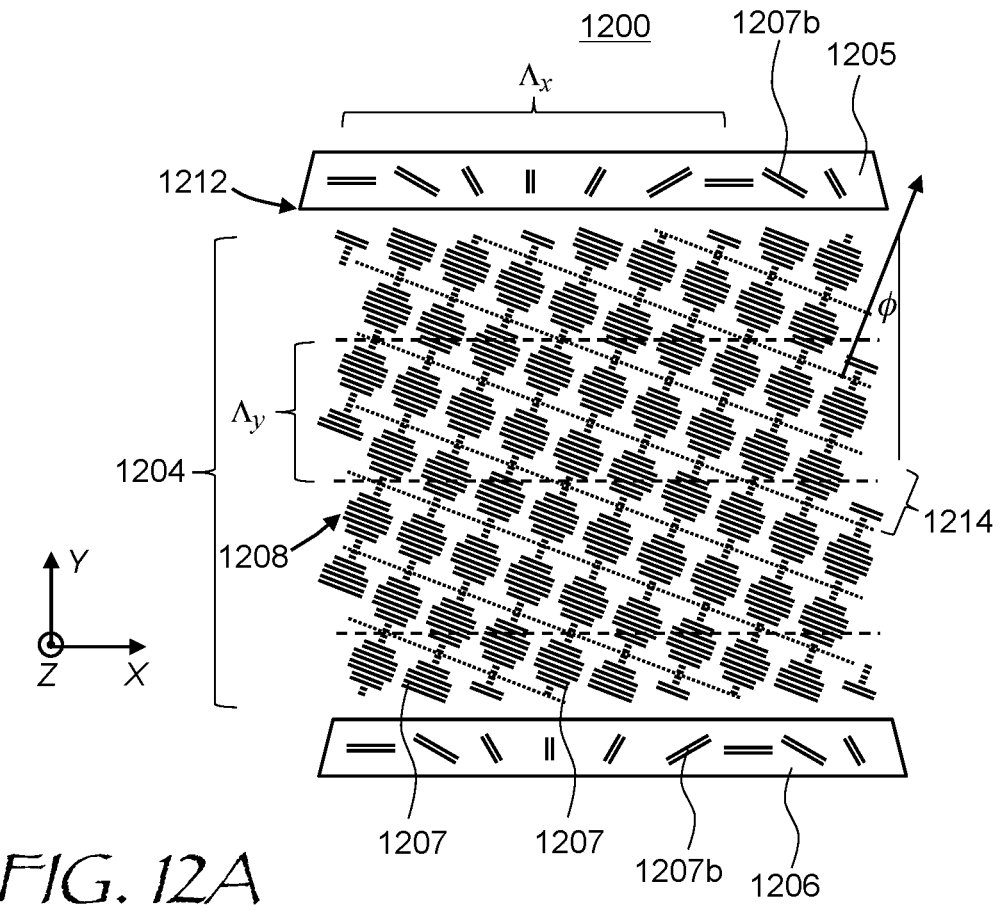
FIG. 12A is a side cross-sectional view of a polarization volume grating (PVH) usable in optical modulators and image projectors of this disclosure.

Turning to FIG. 12A, a polarization volume hologram (PVH) grating 1200 includes an LC layer 1204 bound by opposed top 1205 and bottom 1206 parallel surfaces. The LC layer 1204 may include an LC fluid containing rod-like LC molecules 1207 with positive dielectric anisotropy, i.e. nematic LC molecules. A chiral dopant may be added to the LC fluid, causing the LC molecules in the LC fluid to self-organize into a periodic helical configuration including helical structures 1208 extending between the top 1205 and bottom 1206 parallel surfaces of the LC layer 1204. Such a configuration of the LC molecules 1207, termed herein a cholesteric configuration, includes a plurality of helical periods p, e.g. at least two, at least five, at least ten, at least twenty, or at least fifty helical periods p between the top 1205 and bottom 1206 parallel surfaces of the LC layer 1204.

Boundary LC molecules 1207b at the top surface 1205 of the LC layer 1204 may be oriented at an angle to the top surface 1205. The boundary LC molecules 1207b may have a spatially varying azimuthal angle, e.g. linearly varying along X-axis parallel to the top surface 1205, as shown in FIG. 12A. To that end, an alignment layer 1212 may be provided at the top surface 1205 of the LC layer 1204. The alignment layer 1212 may be configured to provide the desired orientation pattern of the boundary LC molecules 1207b, such as the linear dependence of the azimuthal angle on the X-coordinate. A pattern of spatially varying polarization directions of the UV light may be selected to match a desired orientation pattern of the boundary LC molecules 1207b at the top surface 1205 and/or the bottom surface 1206 of the LC layer 1204. When the alignment layer 1212 is coated with the cholesteric LC fluid, the boundary LC molecules 1207b are oriented along the photopolymerized chains of the alignment layer 1212, thus adopting the desired surface orientation pattern. Adjacent LC molecules adopt helical patterns extending from the top 1205 to the bottom 1206 surfaces of the LC layer 1204, as shown.

The boundary LC molecules 1207b define relative phases of the helical structures 1208 having the helical period p. The helical structures 1208 form a volume grating comprising helical fringes 1214 tilted at an angle φ, as shown in FIG. 12A. The steepness of the tilt angle φ depends on the rate of variation of the azimuthal angle of the boundary LC molecules 1207b at the top surface 1205 and p. Thus, the tilt angle φ is determined by the surface alignment pattern of the boundary LC molecules 1207b at the alignment layer 1212. The volume grating has a period $\Lambda_x$ along X-axis and $\Lambda_y$ along Y-axis. In some embodiments, the periodic helical structures 1208 of the LC molecules 1207 may be polymer-stabilized by mixing in a stabilizing polymer into the LC fluid, and curing (polymerizing) the stabilizing polymer.

Figure 12B:
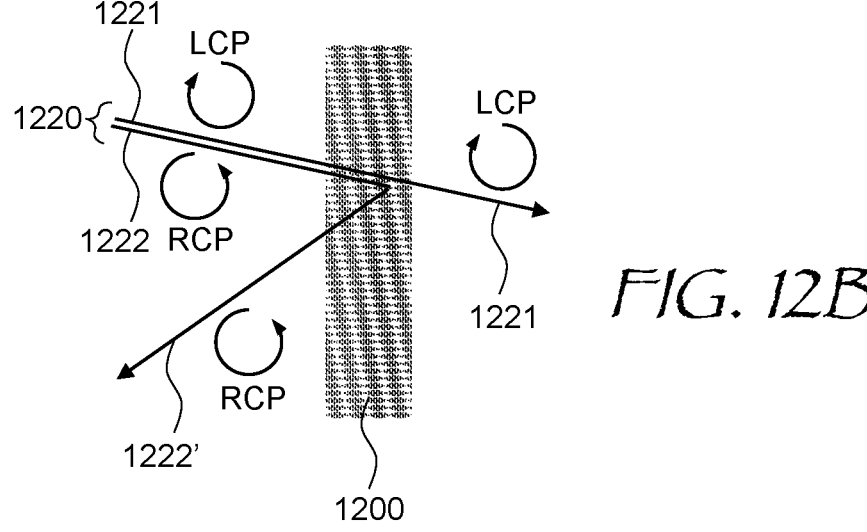
FIG. 12B is a diagram illustrating optical performance of the PVH of FIG. 12A.

The helical nature of the fringes 1214 of the volume grating makes the PVH grating 1200 preferably responsive to light of polarization having one particular handedness, e.g. left- or right-circular polarization, while being substantially non-responsive to light of the opposite handedness of polarization. Thus, the helical fringes 1214 make the PVH grating 1200 polarization-selective, causing the PVH grating 1200 to diffract light of only one handedness of circular polarization. This is illustrated in FIG. 12B, which shows a light beam 1220 impinging onto the PVH grating 1200. The light beam 1220 includes a left circular polarized (LCP) beam component 1221 and a right circular polarized (RCP) beam component 1222. The LCP beam component 1221 propagates through the PVH grating 1200 substantially without diffraction. Herein, the term "substantially without diffraction" means that, even though an insignificant portion of the beam (the LCP beam component 1221 in this case) might diffract, the portion of the diffracted light energy is so small that it does not impact the intended performance of the PVH grating 1200. The RCP beam component 1222 of the light beam 1220 undergoes diffraction, producing a diffracted beam 1222'.

The polarization selectivity of the PVH grating 1200 results from the effective refractive index of the grating being dependent on the relationship between the handedness, or chirality, of the impinging light beam and the handedness, or chirality, of the grating fringes 1214. Changing the handedness of the impinging light may be used to switch the performance of the PVH grating 1200. The PVH grating 1200 may also be made tunable by applying voltage to the LC layer 1204, which distorts or erases the above-described helical structure. It is further noted that sensitivity of the PVH 1200 to right circular polarized light in particular is only meant as an illustrative example. When the handedness of the helical fringes 1214 is reversed, the PVH 1200 may be made sensitive to left circular polarized light. Thus, the operation of the PVH 1200 may be controlled by controlling the polarization state of the impinging light beam 1220. Furthermore, in some embodiments the PVH 1200 may be made switchable by application of electric field across the LC layer 1204, which erases the periodic helical structures 1208.

Figure 13A:
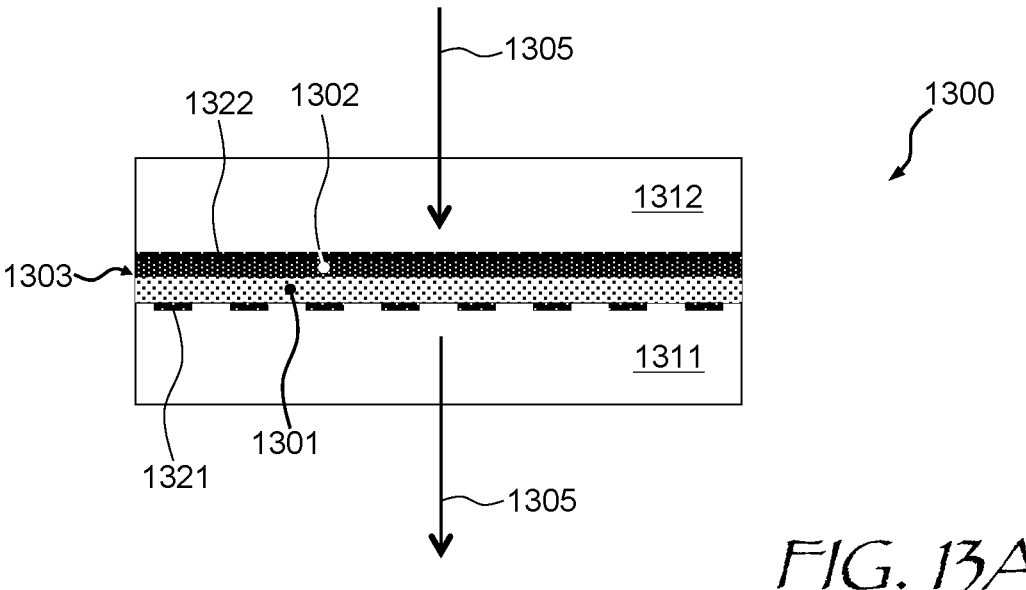
FIG. 13A is a side cross-sectional view of a fluidic grating usable in optical modulators and image projectors of this disclosure, in an OFF state.
Figure 13B:
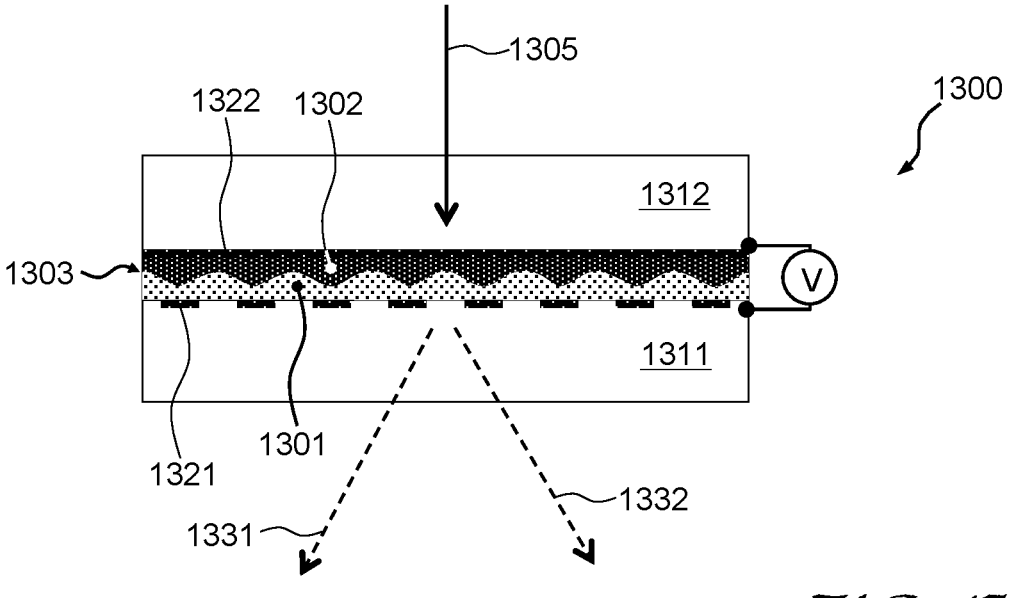
FIG. 13B is a side cross-sectional view of the fluidic grating of FIG. 10A in an ON state.

Referring now to FIGS. 13A and 13B, a fluidic surface-relief grating 1300 includes first 1301 and second 1302 immiscible fluids separated by an inter-fluid boundary 1303. One of the fluids may be a hydrophobic fluid such as oil, e.g. silicone oil, while the other fluid may be water-based. One of the first 1301 and second 1302 fluids may be a gas in some embodiments. The first 1301 and second 1302 fluids may be contained in a cell formed by first 1311 and second 1312 substrates supporting first 1321 and second 1322 electrode structures. The first 1321 and/or second 1322 electrode structures may be at least partially transparent, absorptive, and/or reflective.

At least one of the first 1321 and second 1322 electrode structures may be patterned for imposing a spatially variant electric field onto the 1301 and second 1302 fluids. For example, in 13A and 13B, the first electrode 1321 is patterned, and the second electrodes 1322 is not patterned, i.e. the second electrodes 1322 is a backplane electrode. In the embodiment shown, both the first 1321 and second 1322 electrodes are substantially transparent. For example, the first 1321 and second 1322 electrodes may be indium tin oxide (ITO) electrodes. The individual portions of a patterned electrode may be individually addressable. In some embodiments, the patterned electrode 1321 may be replaced with a continuous, non-patterned electrode coupled to a patterned dielectric layer for creating a spatially non-uniform electric field across the first 1301 and second 1302 fluids.

FIG. 13A shows the fluidic surface-relief grating 1300 in a non-driven state when no electric field is applied across the inter-fluid boundary 1303. When no electric field is present, the inter-fluid boundary 1303 is straight and smooth; accordingly, a light beam 1305 impinging onto the fluidic surface-relief grating 1300 does not diffract, propagating right through as illustrated. FIG. 13B shows the fluidic surface-relief grating 1300 in a driven state when a voltage V is applied between the first 1321 and second 1322 electrodes, producing a spatially variant electric field across the first 1301 and second 1302 fluids separated by the inter-fluid boundary 1303. The application of the spatially variant electric field causes the inter-fluid boundary 1303 to distort as illustrated in FIG. 9B, forming a periodic variation of effective refractive index, i.e. a surface-relief diffraction grating. The light beam 1305 impinging onto the fluidic surface-relief grating 1300 will diffract, forming first 1331 and second 1332 diffracted sub-beams. By varying the amplitude of the applied voltage V, the strength of the fluidic surface-relief grating 1300 may be varied. By applying different patterns of the electric field e.g. with individually addressable sub-electrodes or pixels of the first electrode 1321, the grating pitch and, accordingly, the diffraction angle, may be tuned or varied. More generally, varying the effective voltage between separate sub-electrodes or pixels of the first electrode 1321 may result in a three-dimensional conformal change of the fluidic interface i.e. the inter-fluid boundary 1303 inside the fluidic volume to impart a desired optical response to the fluidic surface-relief grating 1300. The applied voltage pattern may be pre-biased to compensate or offset gravity effects, i.e. gravity-caused distortions of the inter-fluid boundary 1303.

The thickness of the first 1321 and second 1322 electrodes may be e.g. between 13 nm and 50 nm. The materials of the first 1321 and second 1322 electrodes besides ITO may be e.g. indium zinc oxide (IZO), zinc oxide (ZO), indium oxide (IO), tin oxide (TO), indium gallium zinc oxide (IGZO), etc. The first 1301 and second 1302 fluids may have a refractive index difference of at least 0.1, and may be as high as 0.2 and higher. One of the first 1301 or second 1302 fluids may include polyphenylether, 1,3-bis(phenylthio)benzene, etc. The first 1311 and/or second 1312 substrates may include e.g. fused silica, quartz, sapphire, etc. The first 1311 and/or second 1312 substrates may be straight or curved, and may include vias and other electrical interconnects. The applied voltage may be varied in amplitude and/or duty cycle when applied at a frequency of between 130 Hz and 130 kHz. The applied voltage can change polarity and/or be bipolar. Individual first 1301 and/r second 1302 fluid layers may have a thickness of between 0.5-5 micrometers, more preferably between 0.5-2 micrometer.

To separate the first 1301 and second 1302 fluids, surfactants containing one hydrophilic end functional group and one hydrophobic end functional group may be used. The examples of a hydrophilic end functional group are hydroxyl, carboxyl, carbonyl, amino, phosphate, sulfhydryl. The hydrophilic functional groups may also be anionic groups such as sulfate, sulfonate, carboxylates, phosphates, for example. Non-limiting examples of a hydrophobic end functional group are aliphatic groups, aromatic groups, fluorinated groups. For example, when polyphenyl thioether and fluorinated fluid may be selected as a fluid pair, a surfactant containing aromatic end group and fluronirated end group may be used. When phenyl silicone oil and water are selected as the fluid pair, a surfactant containing aromatic end group and hydroxyl (or amino, or ionic) end group may be used. These are only non-limiting examples.

Figure 14:
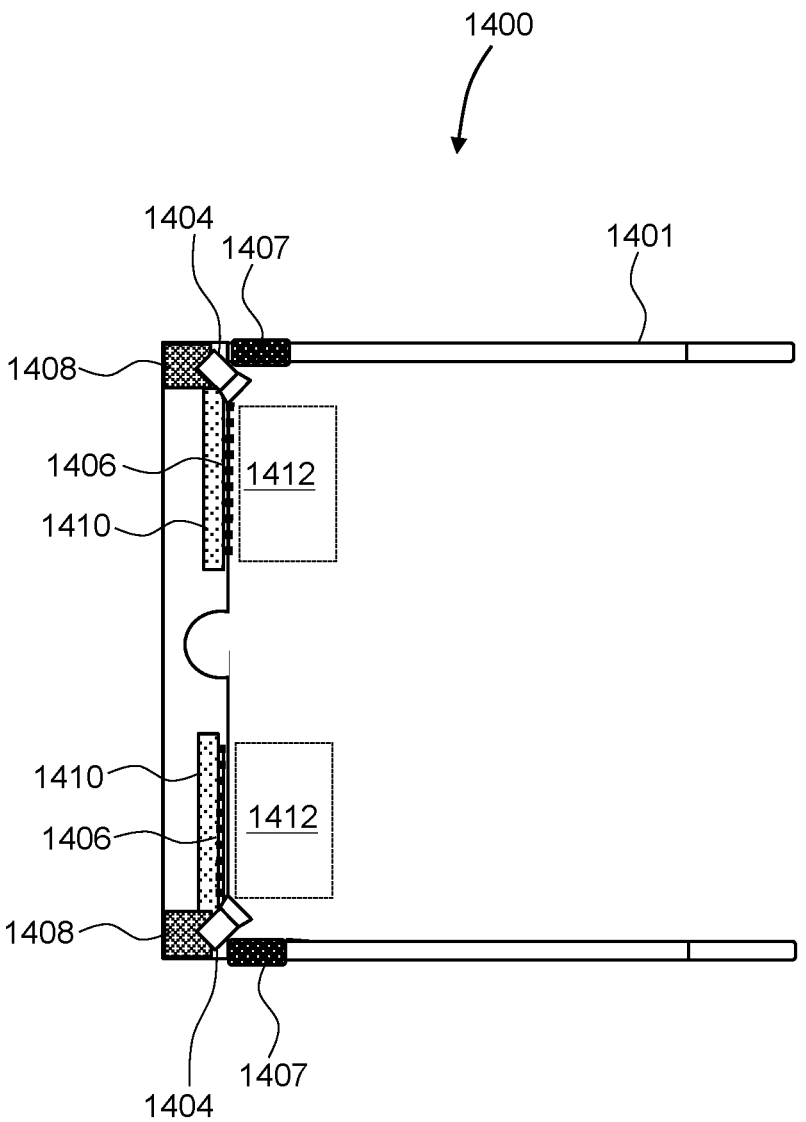
FIG. 14 is a view of an augmented reality (AR) display of this disclosure having a form factor of a pair of eyeglasses.

Referring to FIG. 14, an augmented reality (AR) near-eye display 1400 includes a frame 1401 having a form factor of a pair of eyeglasses. The frame 1401 supports, for each eye: a light source 1408 coupled to an optical modulator 1410, which may include any optical modulator of this disclosure; an eye-tracking camera 1404; a plurality of illuminators 1406; and an eye-tracking camera controller 1407. The illuminators 1406 may be supported by the optical phase modulator 1410 for illuminating an eyebox 1412. The light source 1408 provides a light beam to the optical phase modulator 1410, which forms an image in angular domain.

The purpose of the eye-tracking cameras 1404 is to determine position and/or orientation of both eyes of the user. Once the position and orientation of the user's eyes are known, a gaze convergence distance and direction may be determined. The imagery displayed by the optical modulators 1410 may be adjusted dynamically to account for the user's gaze, for a better fidelity of immersion of the user into the displayed augmented reality scenery, and/or to provide specific functions of interaction with the augmented reality. In operation, the illuminators 1406 illuminate the eyes at the corresponding eyeboxes 1412, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1412. The function of the eye-tracking camera controllers 1407 is to process images obtained by the eye-tracking cameras 1404 to determine, in real time, the eye gazing directions of both eyes of the user.

In some embodiments, the image processing and eye position/orientation determination functions may be performed by a central controller, not shown, of the AR near-eye display 1400. The central controller may also provide control signals to the optical phase modulators 1410 to generate the images to be displayed to the user, depending on the determined eye positions, eye orientations, gaze directions, eyes vergence, etc.

Figure 15:
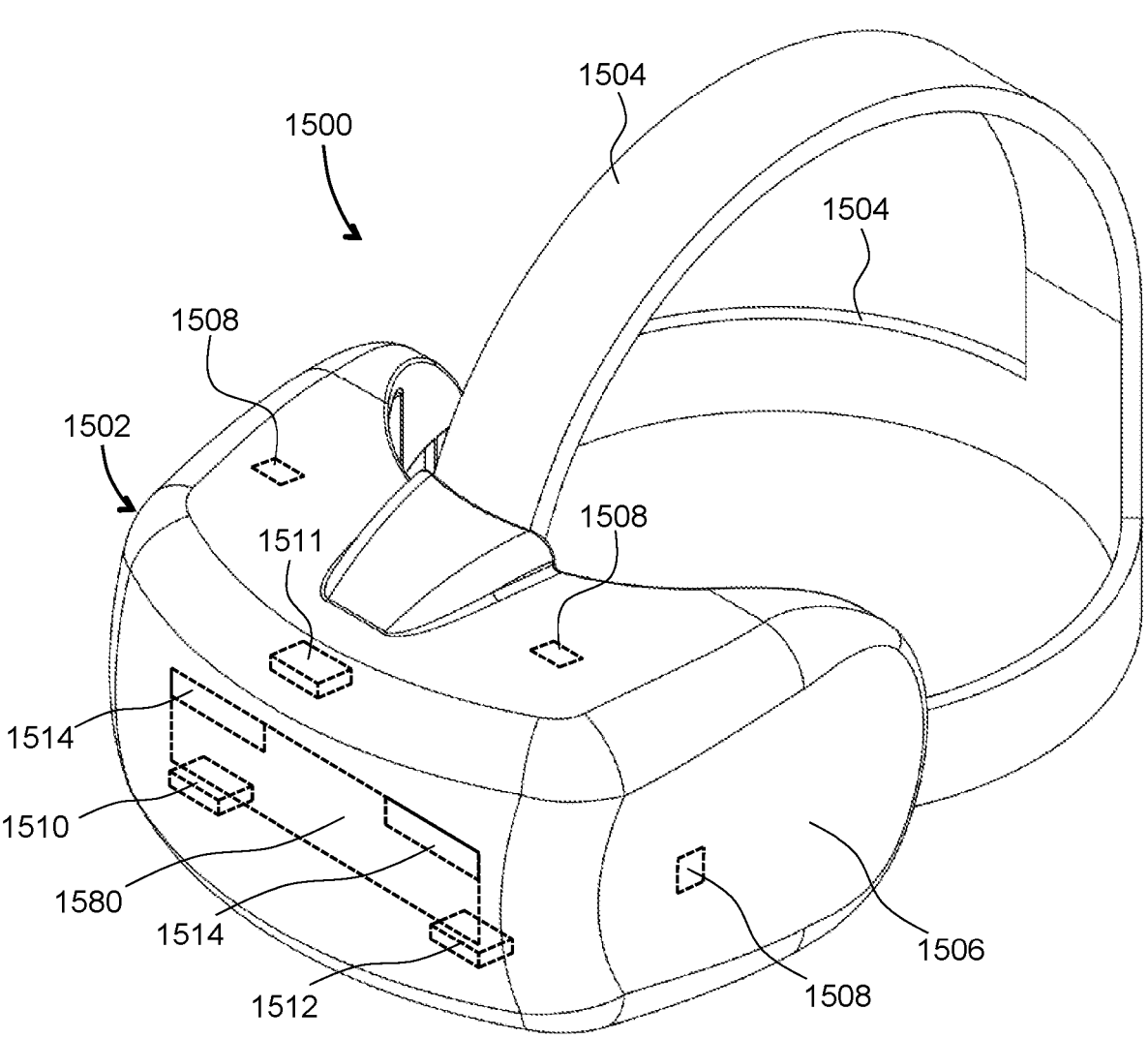
FIG. 15 is a three-dimensional view of a head-mounted display (HMD) of this disclosure.

Turning to FIG. 15, an HMD 1500 is an example of an AR/VR wearable display system which encloses the user's face, for a greater degree of immersion into the AR/VR environment. The HMD 1500 may generate the entirely virtual 3D imagery. The HMD 1500 may include a front body 1502 and a band 1504 that can be secured around the user's head. The front body 1502 is configured for placement in front of eyes of a user in a reliable and comfortable manner. A display system 1580 may be disposed in the front body 1502 for presenting AR/VR imagery to the user. The display system 1580 may include any of the optical modulators and image projectors disclosed herein. Sides 1506 of the front body 1502 may be opaque or transparent.

In some embodiments, the front body 1502 includes locators 1508 and an inertial measurement unit (IMU) 1510 for tracking acceleration of the HMD 1500, and position sensors 1512 for tracking position of the HMD 1500. The IMU 1510 is an electronic device that generates data indicating a position of the HMD 1500 based on measurement signals received from one or more of position sensors 1512, which generate one or more measurement signals in response to motion of the HMD 1500. Examples of position sensors 1512 include: one or more accelerometers, one or more gyroscopes, one or more magnetometers, another suitable type of sensor that detects motion, a type of sensor used for error correction of the IMU 1510, or some combination thereof. The position sensors 1512 may be located external to the IMU 1510, internal to the IMU 1510, or some combination thereof.

The locators 1508 are traced by an external imaging device of a virtual reality system, such that the virtual reality system can track the location and orientation of the entire HMD 1500. Information generated by the IMU 1510 and the position sensors 1512 may be compared with the position and orientation obtained by tracking the locators 1508, for improved tracking accuracy of position and orientation of the HMD 1500. Accurate position and orientation is important for presenting appropriate virtual scenery to the user as the latter moves and turns in 3D space.

The HMD 1500 may further include a depth camera assembly (DCA) 1511, which captures data describing depth information of a local area surrounding some or all of the HMD 1500. The depth information may be compared with the information from the IMU 1510, for better accuracy of determination of position and orientation of the HMD 1500 in 3D space.

The HMD 1500 may further include an eye tracking system 1514 for determining orientation and position of user's eyes in real time. The obtained position and orientation of the eyes also allows the HMD 1500 to determine the gaze direction of the user and to adjust the image generated by the display system 1580 accordingly. The determined gaze direction and vergence angle may be used to adjust the display system 1580 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1502.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical modulator comprising:
a waveguide for guiding a light beam therein in a first direction;
an array of transducers coupled to the waveguide along the first direction, each transducer configured to provide, responsive to a driving signal, an acoustic wave in the waveguide, the acoustic wave exciting a leaky mode of propagation of the light beam in the waveguide resulting in out-coupling of a portion of the light beam from the waveguide; and
an array of reflectors for redirecting the light beam portions out-coupled by the array of transducers from the waveguide, wherein different out-coupled portions are redirected at different angles to provide a compound cone of directions based on a spectrum of an image generated by an image projector.

2. The optical modulator of claim 1, wherein the array of reflectors comprises an array of volume Bragg gratings.

3. The optical modulator of claim 1, wherein reflectors of the array of reflectors are spatially separated from one another for reflecting spatially separated out-coupled portions.

4. The optical modulator of claim 1, wherein the waveguide comprises a layer of piezoelectric material.

5. The optical modulator of claim 4, wherein:
the waveguide further comprises a transparent insulator substrate supporting the layer of piezoelectric material; and
a thickness of the layer of piezoelectric material is less than 1 micrometer.

6. The optical modulator of claim 4, wherein each transducer comprises an electrode coupled to the layer of piezoelectric material.

7. The optical modulator of claim 1, wherein the waveguide comprises a layer of photoelastic material, each transducer of the array of transducers comprising a piezoelectric material mechanically coupled to the layer of photoelastic material.

8. An image projector comprising:
a light source for providing a light beam;
a waveguide comprising an in-coupler for in-coupling the light beam to propagate in the waveguide in a first direction;
an array of transducers coupled to the waveguide along the first direction, each transducer configured to provide, responsive to a driving signal, an acoustic wave in the waveguide, the acoustic wave exciting a leaky mode of propagation of the light beam in the waveguide resulting in out-coupling of a portion of the light beam from the waveguide; and
an array of reflectors for redirecting the light beam portions out-coupled by the array of transducers from the waveguide and toward an exit pupil of the image projector, wherein different out-coupled portions are redirected at different angles to provide a compound cone of directions based on a spectrum of an image generated by the image projector.

9. The image projector of claim 8, wherein angular distributions of brightness of the outcoupled light beam portions are defined by frequency spectra of the driving signals applied to the corresponding transducers of the array of transducers, each angular distribution of brightness forming a portion of an image in angular domain projected by the image projector.

10. The image projector of claim 9, wherein the angles of redirection of the light beam portions by different reflectors of the array of reflectors are selected such that neighboring portions of the image in angular domain at least partially overlap with one another.

11. The image projector of claim 9, further comprising a controller operably coupled to the array of transducers for providing a driving signal to each transducer of the array of transducers for forming a corresponding portion of the image in angular domain.

12. The image projector of claim 8, wherein the waveguide comprises a layer of piezoelectric material.

13. The image projector of claim 12, wherein:

the waveguide further comprises a transparent insulator substrate supporting the layer of piezoelectric material; and a thickness of the layer of piezoelectric material is less than 1 micrometer.

14. The image projector of claim 12, wherein each transducer comprises an electrode coupled to the layer of piezoelectric material.

15. The image projector of claim 8, wherein the waveguide comprises a layer of photoelastic material, each transducer of the array of transducers comprising a piezoelectric material mechanically coupled to the layer of photoelastic material.

16. The image projector of claim 8, wherein the array of reflectors comprises an array of volume Bragg gratings.

17. A method for forming an image in angular domain, the method comprising:

in-coupling a light beam into a waveguide to propagate in the waveguide in a first direction;

using an array of transducers coupled to the waveguide along the first direction to provide a plurality of acoustic waves in the waveguide, each acoustic wave exciting a leaky mode of propagation of the light beam in the waveguide resulting in out-coupling of a portion of the light beam from the waveguide; and using an array of reflectors to redirect the light beam portions out-coupled by the array of transducers from the waveguide, wherein different out-coupled portions are redirected at different angles to provide a compound cone of directions based on a spectrum of an image generated by an image projector.

18. The method of claim 17, wherein angular distributions of brightness of the outcoupled light beam portions are defined by frequency spectra of driving signals applied to the corresponding transducers of the array of transducers, each angular distribution of brightness forming a portion of an image in angular domain.

19. The method of claim 18, wherein the angles of redirection of the light beam portions by different reflectors of the array of reflectors are selected such that neighboring portions of the image in angular domain at least partially overlap with one another to form the image in angular domain.

20. The method of claim 17, further comprising providing a driving signal to each transducer of the array of transducers for forming a corresponding portion of the image in angular domain.

* * * * *